(12) United States Patent
Olsommer

(10) Patent No.: US 9,975,602 B2
(45) Date of Patent: *May 22, 2018

(54) ELECTRIC POWER-ASSIST DEVICE FOR BICYCLES AND BICYCLE EQUIPPED WITH SAID DEVICE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: David Olsommer, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 187 days.

This patent is subject to a terminal disclaimer.

(21) Appl. No.: 14/902,650

(22) PCT Filed: Jul. 4, 2014

(86) PCT No.: PCT/EP2014/064377
§ 371 (c)(1),
(2) Date: Jan. 4, 2016

(87) PCT Pub. No.: WO2015/001111
PCT Pub. Date: Jan. 8, 2015

(65) Prior Publication Data
US 2016/0167735 A1  Jun. 16, 2016

(30) Foreign Application Priority Data
Jul. 4, 2013 (FR) ...................... 13 56528

(51) Int. Cl.
*H02K 7/10* (2006.01)
*H02K 7/18* (2006.01)
*H02K 15/00* (2006.01)
*B62M 6/75* (2010.01)
(Continued)

(52) U.S. Cl.
CPC ............... *B62M 6/75* (2013.01); *B62M 6/90* (2013.01); *H02K 5/04* (2013.01); *H02K 7/116* (2013.01)

(58) Field of Classification Search
CPC ................................ H02K 5/04; B62M 23/02
(Continued)

(56) References Cited

U.S. PATENT DOCUMENTS 4,143,730 A * 3/1979 Desmond ................. B62M 6/60
180/206.8
4,418,776 A * 12/1983 Weirick .................. B62B 1/045
180/19.3
(Continued)

FOREIGN PATENT DOCUMENTS

DE  44 14 618 A1  10/1995
DE  203 14 210 U1  2/2004
(Continued)

OTHER PUBLICATIONS

International Search Report dated Sep. 5, 2014, issued by WIPO in connection with International Application No. PCT/EP2014/064377.
(Continued)

*Primary Examiner* — Jose Gonzalez Quinone
(74) *Attorney, Agent, or Firm* — Fitzpatrick, Cella, Harper & Scinto

(57) ABSTRACT

An electric power-assist device for a bicycle includes an electrical machine with a rotor, a connector structured to attach to the electrical machine, a drive pinion arranged to be driven by the rotor of the electrical machine, and a
(Continued)

supporting structure. The drive pinion is structured to mesh tangentially with a complementary toothing integral to a tyre of a rear wheel of the bicycle. The connector is borne by the supporting structure. The connector together with the electrical machine form a sub-assembly that is manually separatable from the supporting structure.

14 Claims, 9 Drawing Sheets

(51) Int. Cl.
*B62M 6/90* (2010.01)
*H02K 5/04* (2006.01)
*H02K 7/116* (2006.01)

(58) Field of Classification Search
USPC .... 310/67 A, 75 R, 83, 98–99; 180/206, 220
See application file for complete search history.

(56) References Cited

U.S. PATENT DOCUMENTS

| 5,816,355 A | 10/1998 | Battlogg et al. | 180/221 |
| 5,842,535 A * | 12/1998 | Dennis | B62D 63/04 180/206.8 |
| 7,185,726 B2 * | 3/2007 | Young | B62M 6/60 180/206.5 |
| 2007/0222170 A1 * | 9/2007 | Sasnowski | B62M 6/55 280/221 |
| 2011/0114407 A1 | 5/2011 | Lee | 180/205 |
| 2015/0314829 A1 | 11/2015 | Olsommer et al. | B62M 6 75 |
| 2015/0336632 A1 | 11/2015 | Olsommer et al. | B62M 6 75 |

FOREIGN PATENT DOCUMENTS

| DE | 20 2010 012 992 U1 | 3/2011 |
| DE | 10 2010 060 808 A1 | 6/2011 |
| DE | 10 2012 005 756 A1 | 1/2013 |
| JP | S61-200707 U | 12/1986 |
| JP | 2000-280972 A | 10/2000 |
| JP | 2003-341307 A | 12/2003 |

OTHER PUBLICATIONS

D. Olsommer U.S. Appl. No. 14/902,648, filed Jul. 4, 2014.
English translation of Notification of First Office Action in Chinese Application No. 201480037563, which issued on Jun. 22, 2017 by SIPO.

* cited by examiner

ELECTRIC POWER-ASSIST DEVICE FOR BICYCLES AND BICYCLE EQUIPPED WITH SAID DEVICE

FIELD OF THE INVENTION

The present invention concerns electric power-assist devices for bicycles and bicycles equipped with said devices.

RELATED ART

In this field, a number of devices are known which are available on the market.

Some of these devices use an electrical machine placed in the hub of one of the bicycle wheels. This electrical machine drives the wheel directly or via a reduction system. This type of device has the drawback of significant mass, the mass also being situated at the wheel which makes it very perceptible to the cyclist. Furthermore, when the wheel must be removed, for example to change the tyre or repair a puncture, removal of the wheel becomes complicated due to the presence of electrical connections which are necessary to power the electrical machine, and specific fixings for the hub which are necessary to transfer the motor torque.

Other devices use a geared motor driving the pedals of the bicycle and hence use the existing transmission of the bicycle. This type of device has the drawback of a significant impact on the architecture of the bicycle, such that in particular it requires bicycle frames to be designed specifically to receive these devices.

Document DE-20314210-U1 describes a principle of driving a bicycle by an electric motor in which a drive pinion intermeshes with toothing integral with the rim of the front wheel of the bicycle, said toothing being an internal toothing, i.e. the teeth point towards the axle of the wheel. One drawback of this system is that the toothing of the rim is liable to retain stones.

BRIEF DESCRIPTION OF EMBODIMENTS OF THE INVENTION

The object of the invention is therefore to propose an electric power-assist device for bicycles and a bicycle equipped with said device, which solve all or part of these drawbacks.

For this, the invention proposes an electric power-assist device for bicycles, said device comprising:
   an electrical machine comprising a rotor,
   means for fixing the electrical machine,
   a drive pinion driven by the rotor of the electrical machine, and
   a supporting structure,
said device being characterized in that the drive pinion is able to mesh tangentially with a complementary toothing integral to a tyre of a rear wheel of the bicycle, and in that the fixing means are borne by the supporting structure, the fixing means together with the electrical machine forming a sub-assembly which can be separated manually from the supporting structure.

Preferably, means for controlling the electrical machine are also borne by the supporting structure.

Further preferably, the electric power-assist device also comprises a battery for powering the electrical machine, the battery being also borne by the supporting structure.

Preferably, the sub-assembly which can be separated manually from the supporting structure comprises the means for controlling the electrical machine.

Further preferably, the sub-assembly which can be separated manually from the supporting structure comprises the battery.

Also preferably, the battery can also be separated manually from the supporting structure independently of the sub-assembly.

Preferably, the sub-assembly is carried by a framework extending in a substantially horizontal plane, the sub-assembly being able to be separated horizontally from the supporting structure, preferably transversely.

Preferably, the supporting structure comprises a rapid electrical connector for connecting the sub-assembly to interfaces integral with the bicycle.

Preferably, the supporting structure also constitutes a luggage rack.

Preferably, the fixing means comprise an oscillating arm articulated relative to a mount borne by the supporting structure, around an axis substantially parallel to the axis of the electrical machine.

Preferably, the oscillating arm comprises an articulation allowing the electrical machine to be folded against the sub-assembly.

The invention also concerns an electric power-assist kit for bicycles comprising the electric power-assist device described above, said electric power-assist kit also comprising a tyre, said tyre being a pneumatic tyre comprising said complementary toothing.

The invention finally concerns a bicycle with electrical power-assist comprising such an electric power-assist kit.

BRIEF DESCRIPTION OF THE DRAWINGS

Further characteristics and advantages of the invention will appear from the description of preferred embodiments. The figures indicate respectively.

The figures depict various views of the assembly and details of preferred embodiments of an electric power-assist device and of a bicycle with electric power assistance according to the invention. On the different figures, identical or similar elements carry identical references. The references are not symmetrically shown on each figure, in order to simplify understanding of the drawings.

DETAILED DESCRIPTION OF EMBODIMENTS OF THE INVENTION

Figure 1:
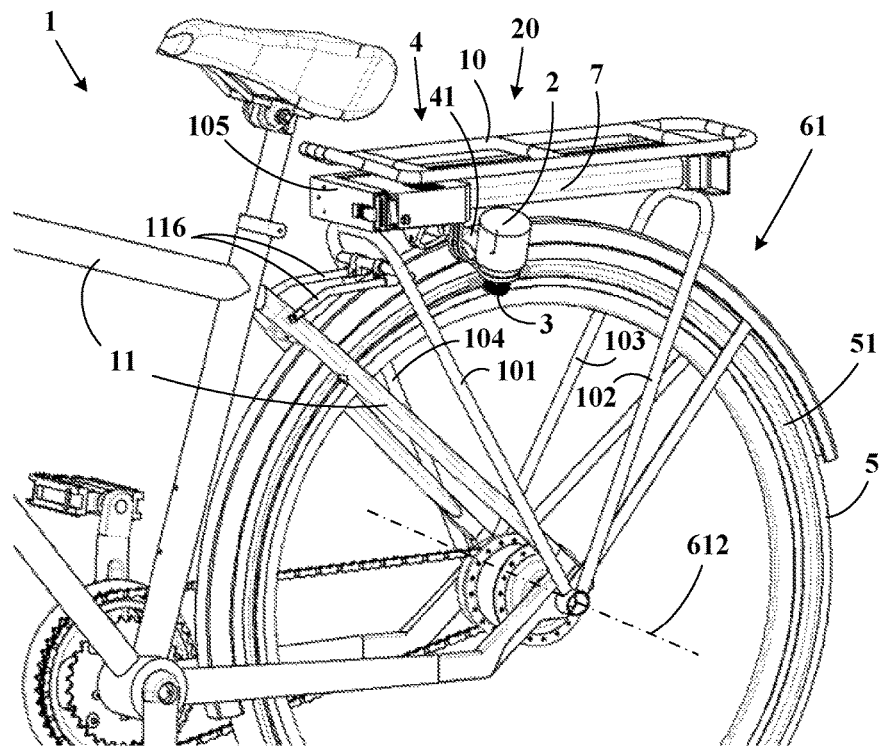
FIG. 1: a (partial) side view of a bicycle with electric power-assist according to a first embodiment of the invention.

FIG. 1 shows the main elements of a bicycle with electric power assistance according to the invention. An electrical machine 2 is fixed close to a tyre 5, here close to the tyre of the rear wheel 61. A drive pinion 3 meshes tangentially with a toothing 51 integral to the tyre 5 and may thus transmit a driving force to this, to assist the cyclist. The electrical machine is preferably a three-phase, brushless, synchronous motor with permanent magnets. Further preferably, the rotor is an external rotor as shown on the figures. A battery 7 powers the electrical machine.

Means 4 for fixing the electrical machine are borne by a supporting structure 10, itself fixed to the frame 11 of the bicycle. Arms 101, 102, 103, 104 of the supporting structure are preferably fixed to the axle of the wheel 612. Rods 116 immobilise the rotation of the supporting structure around the axis of the wheel. The supporting structure is fixed to the axle of the wheel, which allows simple assembly while guaranteeing high precision and reproducibility of positioning of the drive pinion 3 relative to the toothing 51 of the tyre.

Preferably, the battery is also borne by the supporting structure as shown here. Alternatively, the battery may be fixed to another part of the bicycle in a manner known in itself.

Preferably, means 8 for controlling the electrical machine, i.e. the control and power electronics, are also borne by the supporting structure.

A separable sub-assembly 20 is formed by the fixing means and the electrical machine. This sub-assembly can be separated manually from the supporting structure, i.e. without a tool. Preferably, the sub-assembly 20 also comprises the control means 8.

Figure 2:
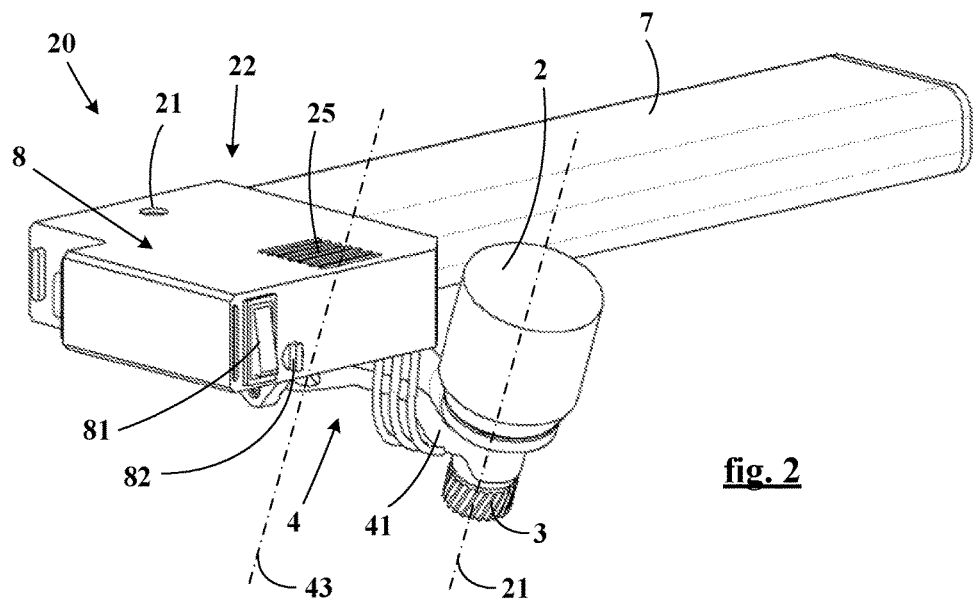
FIG. 2: a detailed view of the sub-assembly according to a preferred embodiment of the invention.

In embodiments where the battery 7 is borne by the supporting structure, the separable sub-assembly may also comprise said battery as shown on FIG. 2. It is understood that the act of removing such a sub-assembly 20 from the supporting structure allows the bicycle to be used without electric power assistance, but also without the extra weight associated with such electric power assistance and with its energy source.

In the embodiment shown here, the control means 8 comprise a switch 81 allowing the cyclist to start or stop the power-assist device, and a rotary knob 82 for adjusting the level of power assistance. These controls may also be placed on the handlebars of the bicycle or controlled remotely via a remote control or an application installed in the cyclist's mobile telephone. An electric power socket 21 for charging the battery is accessible even when the sub-assembly is mounted in the supporting structure.

Figure 3:
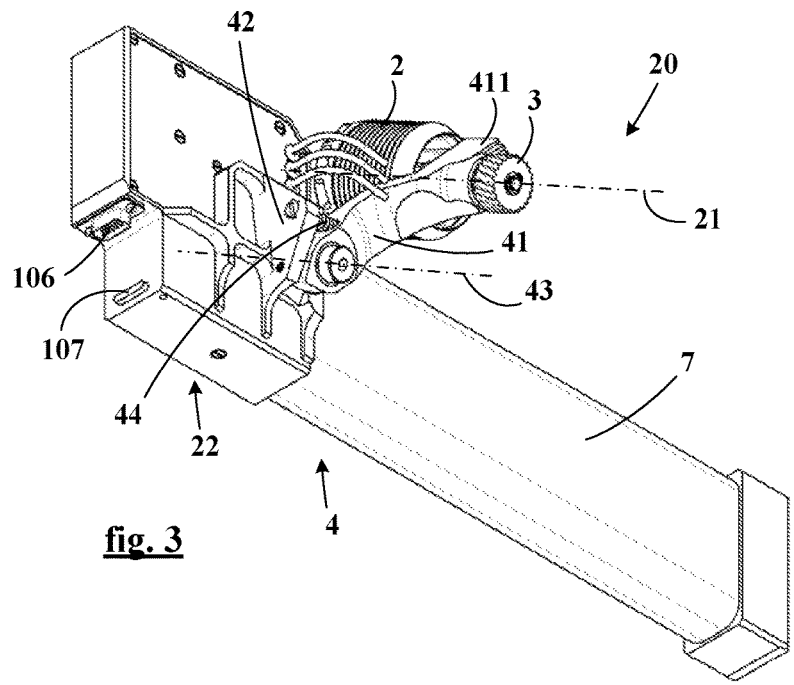
FIG. 3: a view from below of the sub-assembly of FIG. 2.

FIG. 3 shows this sub-assembly 20 in a view from below. It can be seen that the means 4 for fixing the electrical machine preferably comprise an oscillating arm 41 and a mount 42, the mount being intended to be integral with the supporting structure and the oscillating arm 41 being articulated relative to the mount around an oscillation axis 43 which runs substantially parallel to the axis 21 of the electrical machine. A spring 44 stresses the arm such that the pinion is pressed against the tyre with a certain minimum contact force. Also, FIG. 3 shows a rapid electrical connector 106 and a slot 107 for a locking means with key.

The mechanical assembly corresponding to the separable sub-assembly 20 without its battery is called the "motor block". The motor block 22 thus comprises in particular the mount 42, the oscillating arm 41, the electrical machine 2 and preferably also the electronic power and control circuits. It is understood that this motor block must be fixedly attached to the supporting structure when the electric power-assist device is used. Fins 25 may be provided on one or more faces of the motor block 22 (see FIG. 2), in order to improve the cooling of the power electronics situated inside the motor block 22 in contact with the face(s) fitted with fins 25. This cooling principle is particularly effective in the case where the motor block or fins are made of a material with good thermal conduction, such as aluminium for example.

Figure 4:
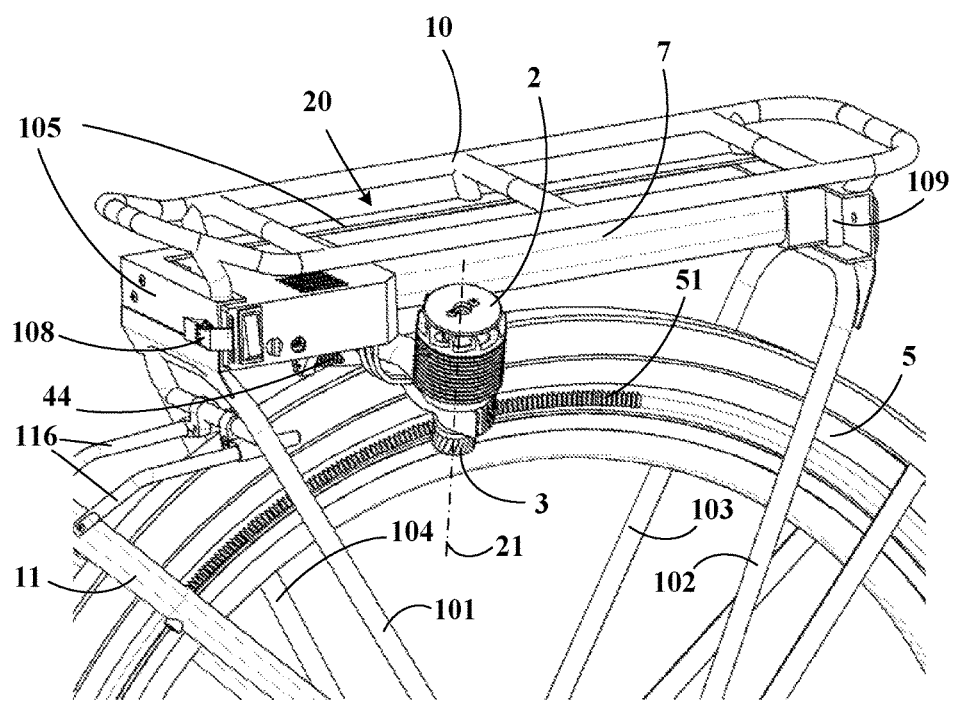
FIG. 4: a detailed view on a larger scale of the electric power-assist device and the bicycle with electric power assistance of FIG. 1.

FIG. 4 shows clearly the supporting structure 10 carrying the separable sub-assembly 20. We see that the supporting structure comprises a framework 105 extending in a substantially horizontal plane. The sub-assembly 20 may slide horizontally in the framework and be fixed there via a rapid fixing 108 at the front. The rear end of the sub-assembly 20 (consisting of the rear part of the battery) is blocked in the framework by a fixed stop 109.

Figure 5:
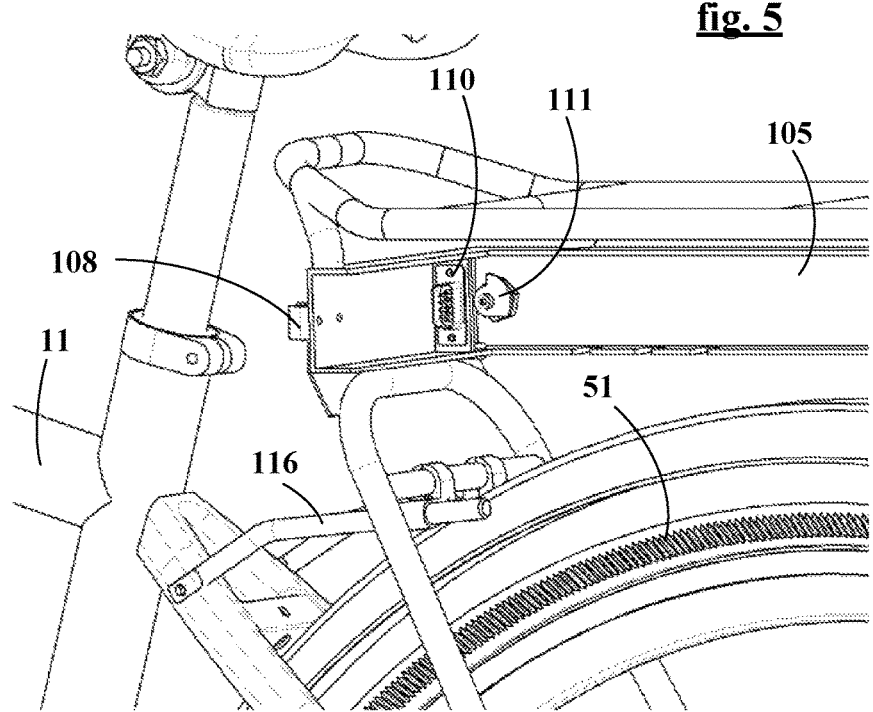
FIG. 5: a detailed view showing in particular the supporting structure of the electric power-assist device of FIG. 1.

In FIG. 5, the sub-assembly 20 has been removed and we see a stationary electrical connector 110 able to cooperate with the connector 106 of the sub-assembly. The stationary connector 110 allows connection of the electric power-assist device to interfaces or sensors installed on the bicycle. A control interface on the handlebars may be provided to allow the cyclist to access information and/or control the device. Sensors which may be useful for controlling the electric power-assist device include for example pedal sensors, a pedal torque sensor, a speed sensor. The connector may also serve to power the lighting of the bicycle from the battery 7. We also see locking means 111 and the rapid fixing 108. By comparing mainly FIGS. 3, 4 and 5, we see that the installation of the sub-assembly 20 according to this embodiment consists of placing the end of the battery in position behind the fixed stop 109, then pivoting the front of the sub-assembly 20 in a horizontal plane until the rapid fixing 108 engages. In this position, the stationary connector 110 is fixedly connected to the connector 106 of the sub-assembly, and the locking means 111 (for example with key) can be actuated and cooperate with the slot 107 of the sub-assembly (visible on FIG. 3) in order to secure it in the usage position if necessary. In another embodiment (not shown on the figures), it is possible to have a system in which the motor block 22 and the electrical connectors 106 and 110, and the locking system 107, 111 and 112, are situated not at the front of the supporting structure 10 as described on FIGS. 1 to 12, but at the rear of the supporting structure 10. In such an embodiment, the stop 109 would then be situated at the front of the supporting structure 10.

Figure 6:
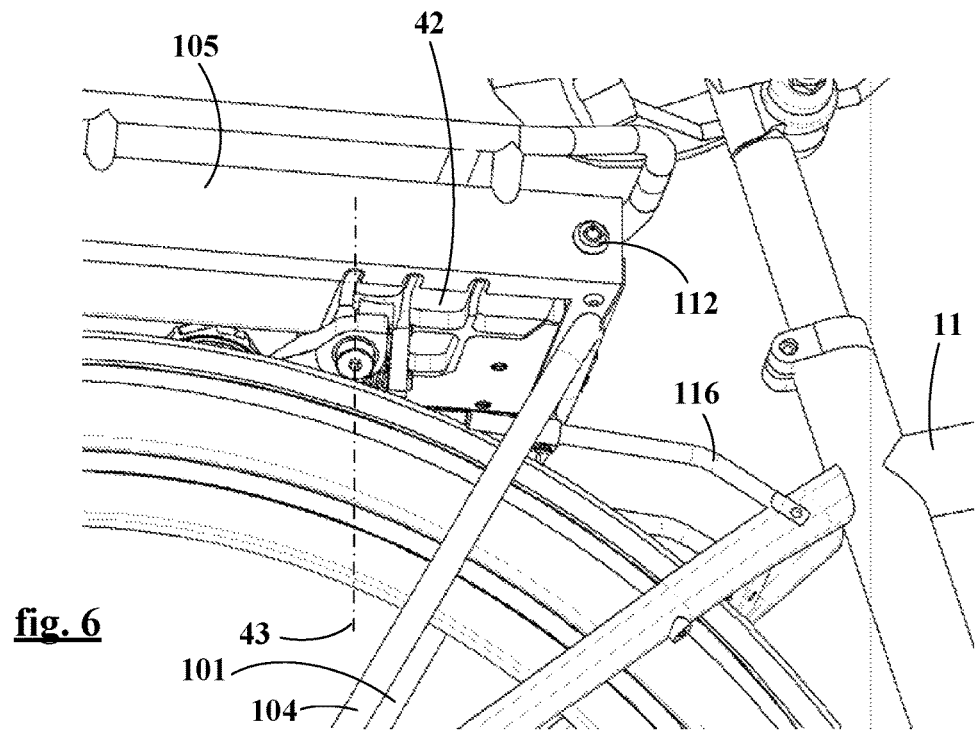
FIG. 6: a view similar to that of FIG. 4 from the other side of the bicycle with electric power assistance of FIG. 1.

FIG. 6 shows, from the other side of the bicycle, the same sub-assembly installed in the supporting structure. In particular, we see the barrel 112 of the lock with key.

FIGS. 7 to 12 show a second preferred embodiment of the invention in which the battery 7 can be separated from the sub-assembly 20 and extracted from the supporting structure independently of the rest of the sub-assembly, i.e. independently of the motor block 22.

Figure 7:
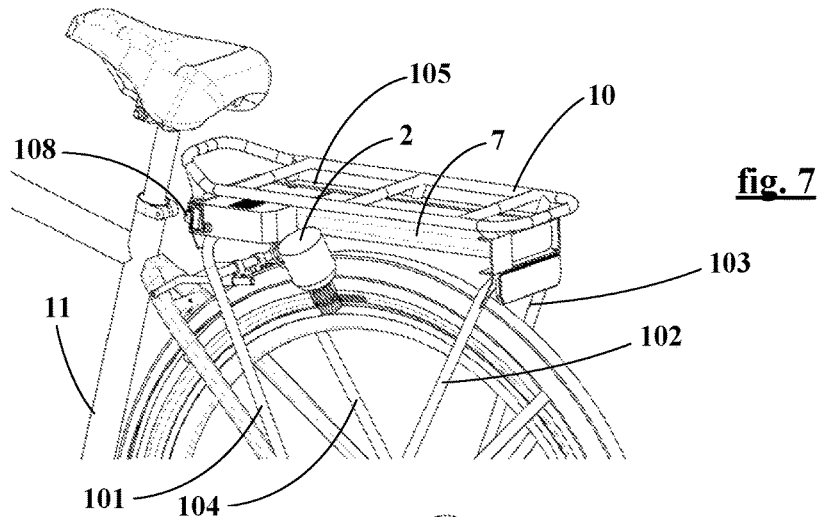
FIG. 7: a view similar to FIG. 1 showing another preferred embodiment of the device of the invention.
Figure 8:
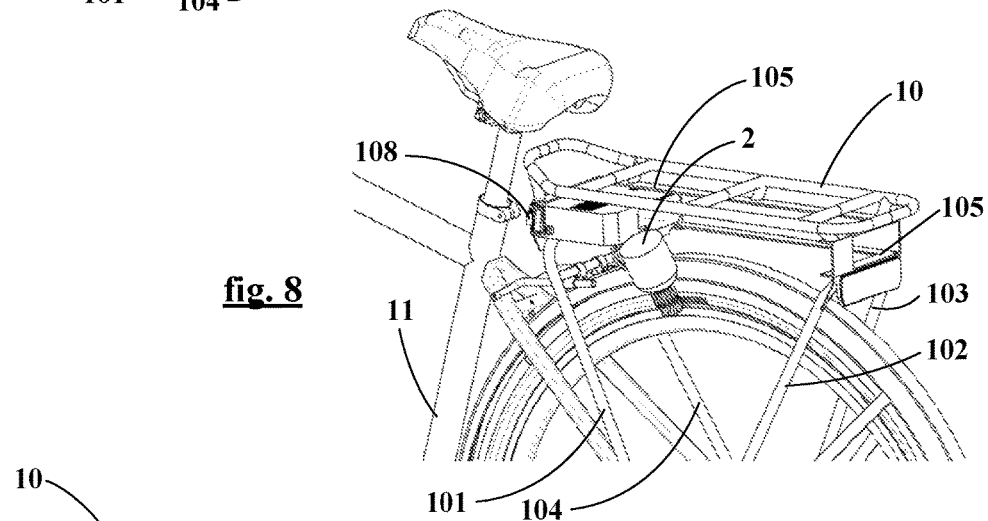
FIG. 8: a view identical to FIG. 7 in which the battery has been removed.

FIG. 7 shows the device when the battery is in place, and FIG. 8 shows the device when only the battery has been removed. It is understood that the battery is extracted from the supporting structure horizontally in a longitudinal movement towards the rear.

Figure 9:
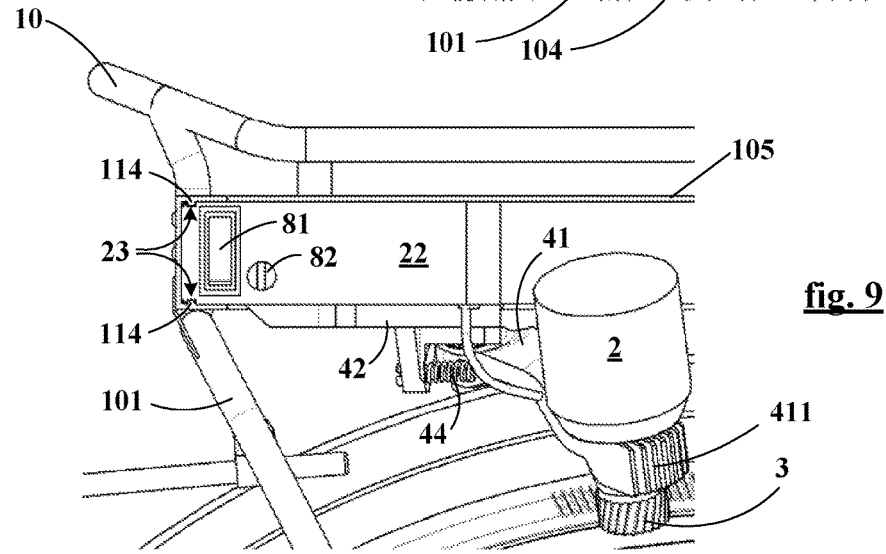
FIG. 9: a detailed view of the device of FIGS. 7 and 8.

FIG. 9 shows in particular the transverse ribs 114 of the framework 105 which cooperate with transverse grooves 23 of the motor block. This arrangement allows the sub-assembly to be guided during its installation in the framework, and ensures a rigid and reliable support of the mount 42 and hence of the means for fixing the electrical machine 2. In this embodiment, the sub-assembly must therefore be extracted horizontally in a transverse movement. During this extraction, the battery may remain fixed to the motor block (as shown in FIG. 7) and therefore follows the same movement. The battery may also have been removed previously via the rear of the supporting structure, as shown on FIG. 8.

Figure 10:
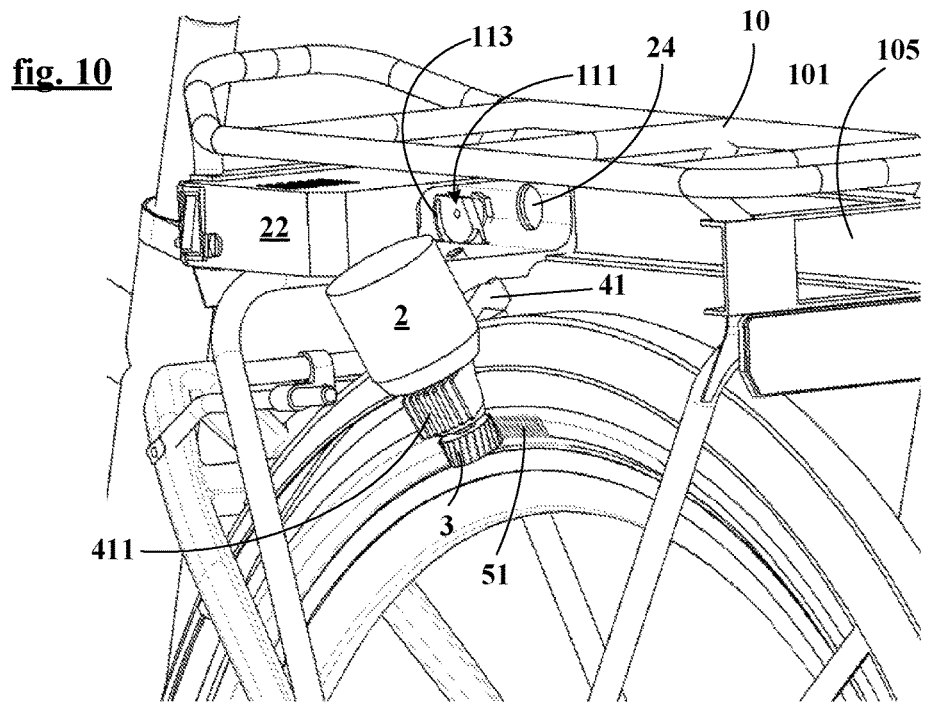
FIG. 10: and even more detailed view of the device in FIG. 8.

FIG. 10 shows from a different angle the same sub-assembly in place in the supporting structure, without the battery. This view shows the locking means 111 which are adapted to the different situations and handling described above. The sector of the locking means 111 comprises an inwardly curved groove 113 intended to cooperate with a finger 71 of the battery (see FIG. 11) in order to selectively lock it in place or allow its removal, depending on the angular position of the sector. The locking means comprise a third position allowing release and hence extraction of the complete sub-assembly (or the motor block, in the case where the battery has already been removed). It is understood that the position shown in FIG. 9 is that which allows extraction of the battery while the motor block remains locked. On FIGS. 9 and 10, we also see the cooling fins 411 protruding from the oscillating arm 41. These fins promote the cooling of the stator of the electrical machine by the ambient air, since the internal stator of the electrical machine is integral with the arm 41 (see also FIG. 3).

Figure 11:
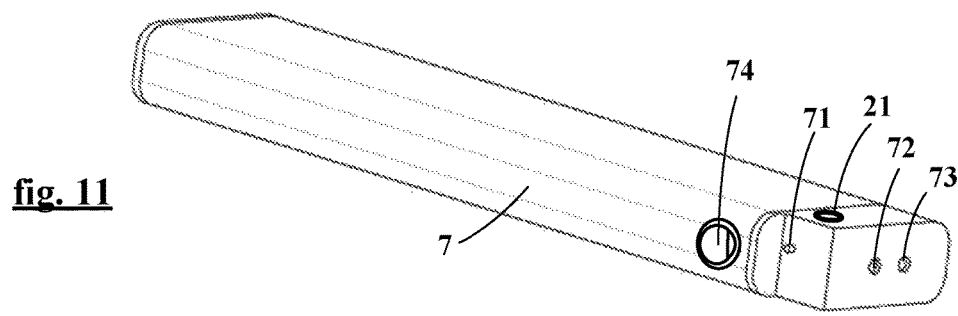
FIG. 11: a view of the battery fitted to the device in FIGS. 7 and 8.

As shown on FIG. 11, the battery comprises an elastic button 74 intended to cooperate with an opening 24 of the sub-assembly (see FIG. 10) to ensure a rapid and secure connection (by clipping) of the battery 7 to the motor block 22, even in the absence of a lock. The battery also comprises two contacts 72 and 73 for its electrical connection to the motor block, and a charging socket 21.

Figure 12:
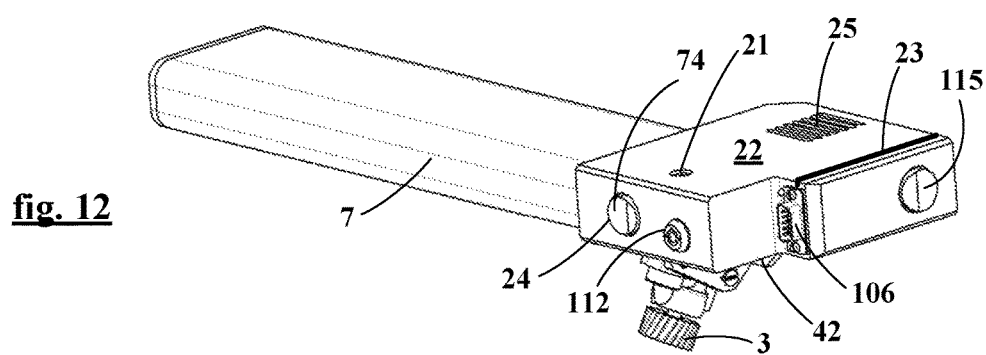
FIG. 12: a general view of the sub-assembly according to a variant of the second preferred embodiment of the invention.

FIG. 12 shows the complete sub-assembly 20 according to a variant of this embodiment in which the motor block also comprises an elastic button 115, similar to the elastic button 74 of the battery. The elastic button 115 is intended to cooperate with an opening made on the front face of the framework 105 in order to ensure a rapid and secure connection (by clipping) of the motor block 22 to the supporting structure even in the absence of a lock.

Figure 13:
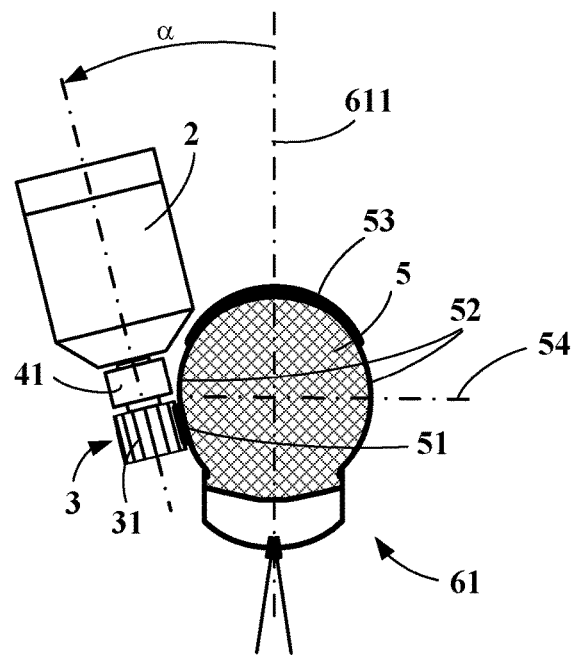
FIG. 13: a diagrammatic cross-section view showing the cooperation of the electrical machine with the tyre of the bicycle with electric power assistance according to the invention.

FIG. 13 shows, in a view in the plane of the wheel, a preferred embodiment of the cooperation between the electrical machine 2 and the tyre 5. We see the toothing 31 of the drive pinion 3 meshing tangentially with the complementary toothing 51 of the tyre. The electrical machine is inclined by an angle $\alpha$ relative to the plane 611 of the wheel 61. According to the invention, the angle $\alpha$ may vary but it is preferably between $-10°$ and $+30°$. On this example, $\alpha$ is approximately 25°, the toothing 51 is integral to a flank 52 of the tyre and is situated radially below the equator line 54. The tyre may be a pneumatic or non-pneumatic tyre, or a solid tyre.

Preferably, the electrical machine drives the drive pinion directly, i.e. without any means of intermediate reduction, the pinion being borne by the shaft of the electrical machine. According to a preferred embodiment of the invention, a freewheel mechanism is however interposed between the shaft and the pinion, such that the tyre does not drive the electrical machine when the bicycle is moving forward. In the hypothesis in which the device does not have a freewheel, an electrical energy recuperation device may be implemented when the cyclist brakes.

As shown on all figures, the electrical machine 2 is preferably placed radially outside the drive pinion 3 relative to the axle 612 of the bicycle wheel, i.e. above the drive pinion 3 in this configuration.

Figure 14:
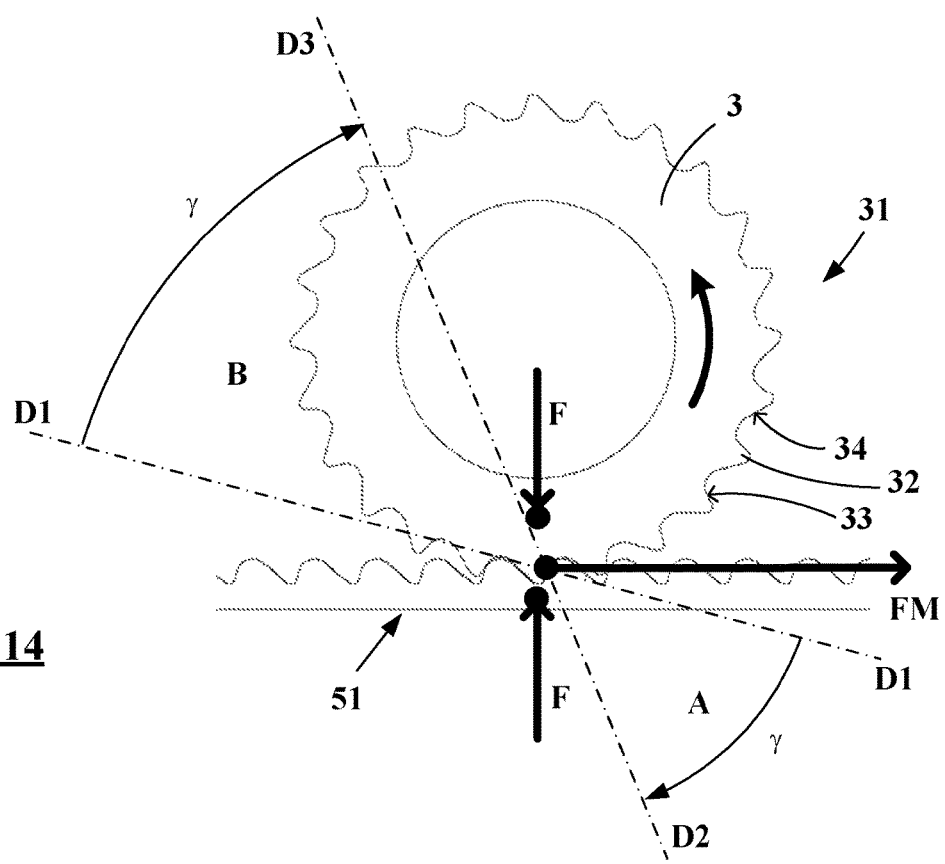
FIG. 14: a detailed cross section view of the meshing of the drive pinion with the toothing of the tyre according to a preferred embodiment of the invention.

FIG. 14 shows in detail the meshing of the drive pinion 3 on the tyre. This pinion transmits a motor force FM to the tyre. Here we see a preferred embodiment in which the teeth 32 of the pinion are asymmetric and configured such that the opening angle of their drive faces 33 is smaller than the opening angle of their non-drive faces 34. The form of the complementary toothing 51 integral to the tyre is naturally adapted accordingly. This arrangement significantly improves the efficiency of the engagement, and also increases the maximum value of the transmissible motor force FM. The contact force F of the pinion on the tyre is also depicted. This force is transmitted by the means for fixing the electrical machine, and its effect is to maintain the engagement even in the case of deformation of various elements of the device. If the contact force of the pinion in the absence of driving force is F0, and the additional dynamic force created by the effect of the drive force is FD, we have $F=F0+FD$.

Figure 16:
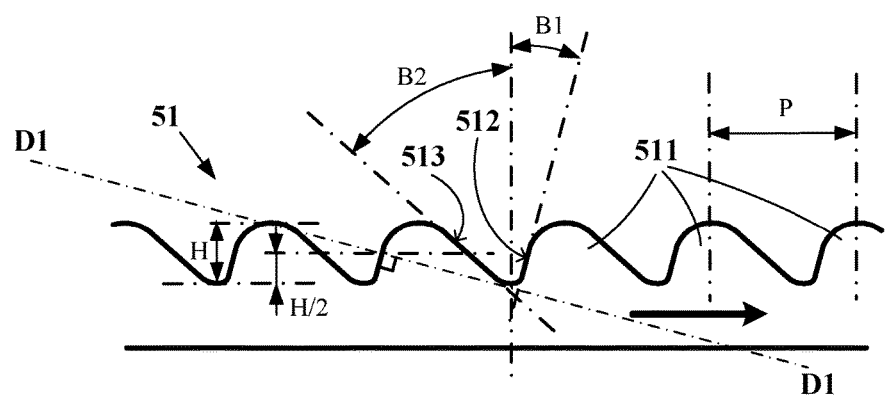
FIG. 16: a diagrammatic cross-section view of the detail of a toothing of a preferred embodiment of a tyre according to the invention.

Line D1 is the line perpendicular to the tangent of the teeth at the contact point half-way up the teeth (see also FIG. 16). The half-lines D2 and D3 are spaced from D1 by an angle $\gamma$. Sector A corresponds to the area between line D1 and half-line D2. Sector B corresponds to the area between line D1 and half-line D3. Preferably, angle $\gamma$ does not exceed 60°. One way of ensuring that the drive force generates an additional dynamic contact force is to verify that the position of the intersection of axis 43 with the median plane of the pinion fulfils one of the following conditions:

If axis 43 is situated in front of the pinion relative to the direction of travel of the bicycle (case shown on FIGS. 1 to 12), the intersection must be situated in sector A shown on FIG. 14.

If axis 43 is situated behind the pinion relative to the direction of travel of the bicycle (case shown on FIGS. 19 to 21), the intersection must be situated in sector B shown on FIG. 14.

Figure 15:
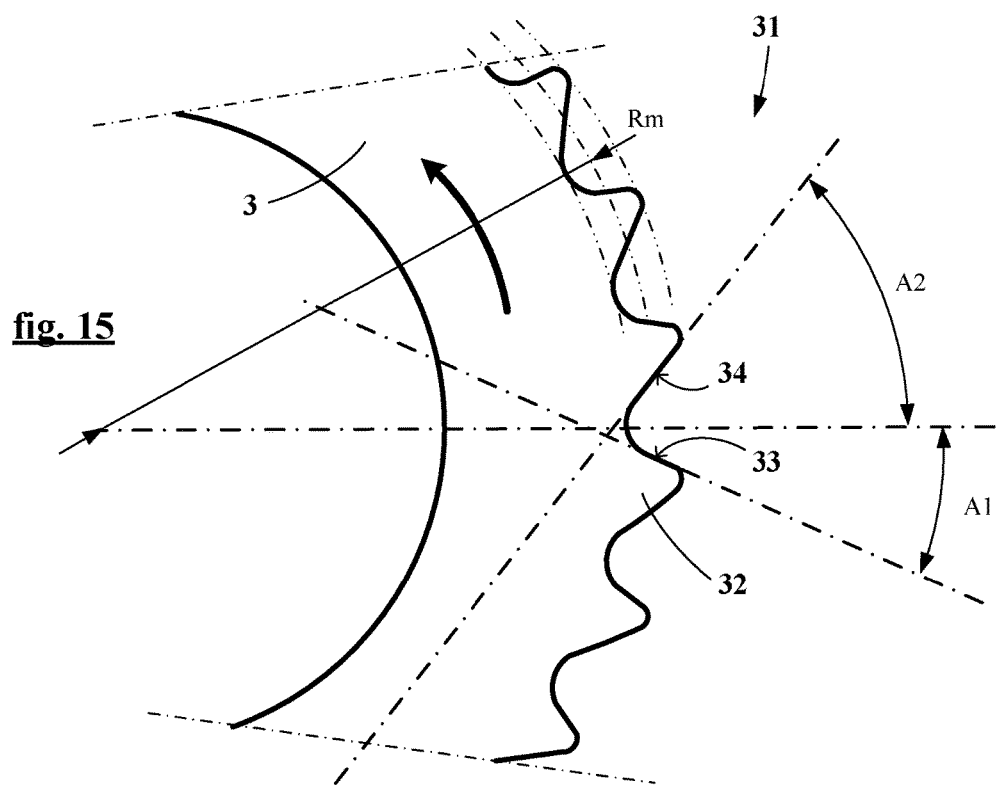
FIG. 15: a diagrammatic cross-section view of the detail of the toothing of the drive pinion from FIG. 14.

FIG. 15 shows on a larger scale the toothing 31 of the pinion 3 in order to better illustrate the preferred asymmetric embodiment described in FIG. 12. We see that the opening angle A1 of the drive faces 33 is substantially smaller than the opening angle A2 of the non-drive faces 34.

FIG. 16 shows on a larger scale the toothing 51 of the tyre in order to better illustrate a preferred embodiment. Following the same logic as for the drive pinion, the teeth 511 of the tyre toothing have drive faces 512 and non-drive faces 513. We see that the opening angle B1 of the drive faces 512 is substantially smaller than the opening angle B2 of the non-drive faces 513. The toothing has a pitch P and a height H. The pitch of the toothing is preferably between 1.8 mm and 5.5 mm. This figure also shows the line D1 mentioned above with reference to FIG. 14.

FIGS. 15 and 16 illustrate toothing comprising rectilinear faces. In the case of curved faces, the angles described above must be measured taking into account the tangent at the point of the profile corresponding to half the height of the tooth (see the mean radius Rm on FIG. 15 and half the height H/2 on FIG. 16).

Figure 17:
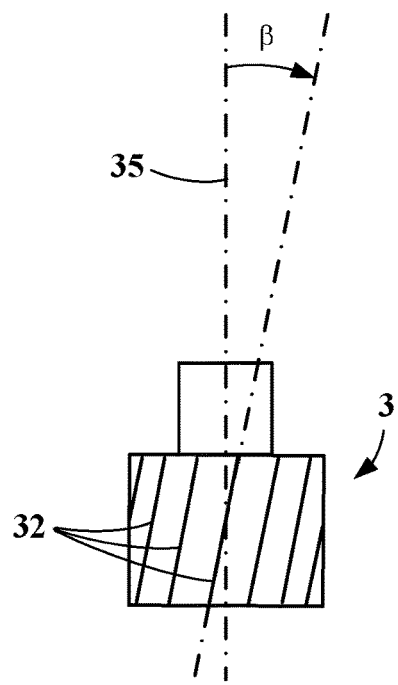
FIG. 17: a side view of a drive pinion with helical toothing according to a preferred embodiment of the device of the invention.

FIG. 17 shows a preferred embodiment of the drive pinion 3 in which the toothing is a helical toothing similar to that shown on FIGS. 1 to 12. The axis of the teeth 32 is inclined by an angle β relative to the axis 35 of the pinion and hence relative to the shaft of the electrical machine 21. The angle β shown here is around 15°, but it may for example lie between 4 and 40°, and preferably between 10 and 30°. The incline of the toothing of the tyre must naturally be adapted accordingly. This arrangement allows a substantial reduction in the noise caused by the intermeshing. Preferably, the drive pinion 3 is made of metal, for example steel. Where applicable, the freewheel mentioned above may be integrated inside the pinion.

Figure 18:
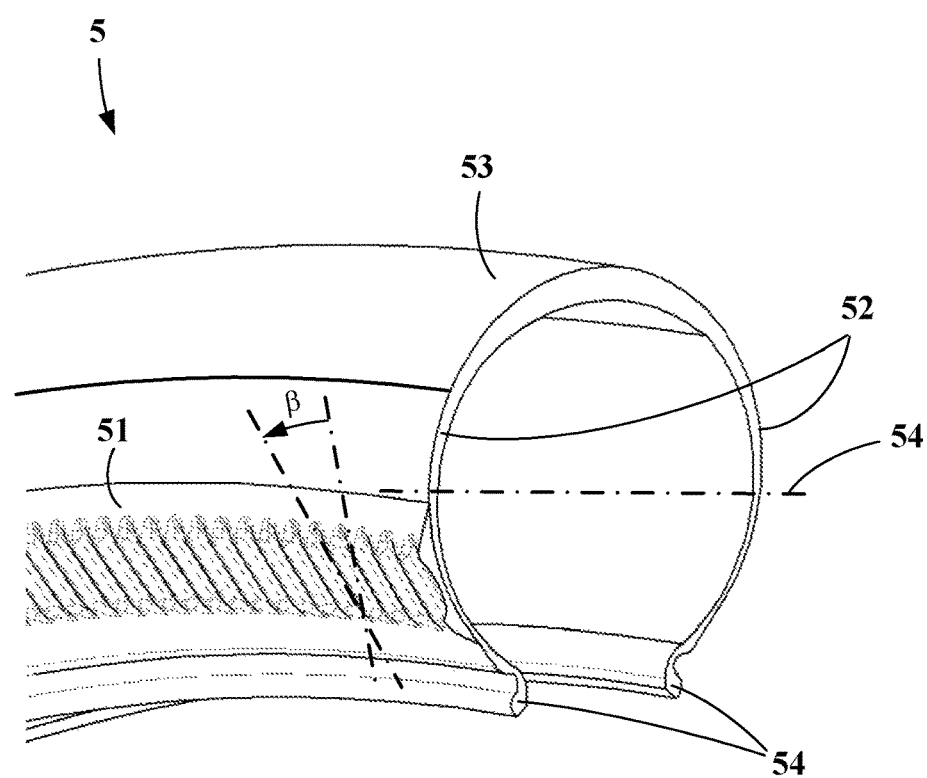
FIG. 18: a cross-section, perspective view of a pneumatic tyre fitted to a bicycle according to the invention.

FIG. 18 shows a preferred embodiment of the tyre 5. This is a pneumatic tyre comprising, in a manner known in itself, flanks 52, a tread 53 and beads 54 for anchoring it to a wheel rim of a bicycle (not shown). We also see that the teeth of the toothing 51 integral with the flank are inclined relative to the radial direction of the tyre by an angle corresponding to the helix angle β described for the drive pinion with reference to FIG. 17.

Preferably, the toothing of the tyre mainly consists of rubber with Shore A hardness preferably between 55 and 85. The toothing is preferably moulded at the same time as the pneumatic tyre, but may also be applied to a conventional tyre previously moulded.

A textile reinforcement may be associated with the surface of the toothing in order to limit the abrasive wear and the toothing noise. It is advantageous to use textile reinforcing fabrics of the polyamide type, woven so as to be able to be stretched during moulding of the toothing.

In a preferred manner and as already shown on FIG. 13, the toothing 51 is placed radially below the equator line 54 of the tyre 5. Alternatively, the toothing may be placed on the shoulder of the tyre, i.e. close to the tread 53, or even in the centre of the tread 53 in the horizontal position.

Figure 19:
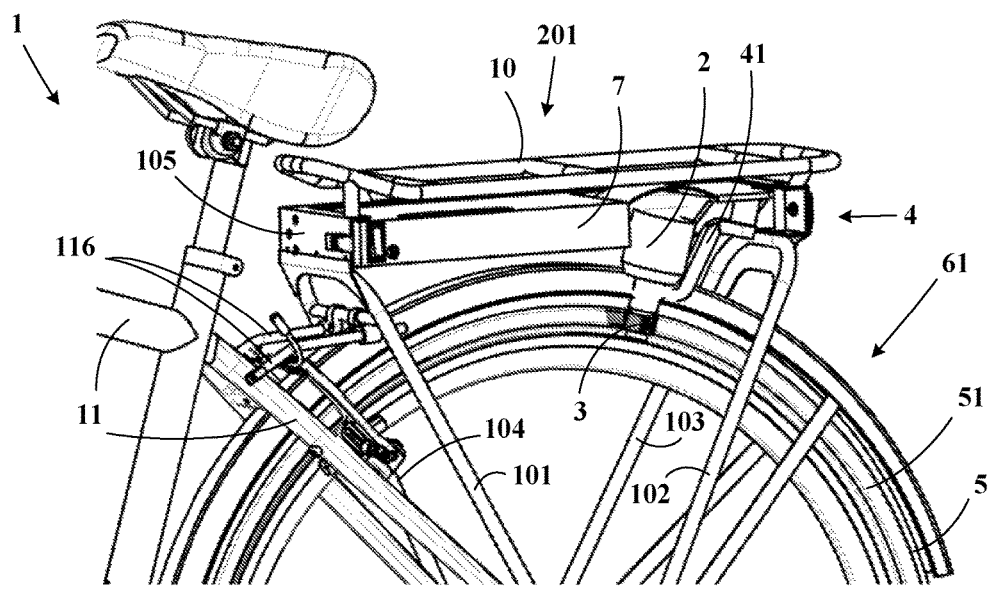
FIG. 19: a (partial) side view of a bicycle with electric power assistance according to a third embodiment of the invention.

FIG. 19 shows a third embodiment of the electric power-assist device according to the invention, wherein the axis 43 of oscillation of the arm is located behind the pinion relative to the direction of travel of the bicycle. On this example, angle α is around 5° and angle β around 24°. Note that these angles are also fully applicable in the configurations of the preceding figures.

Figure 20:
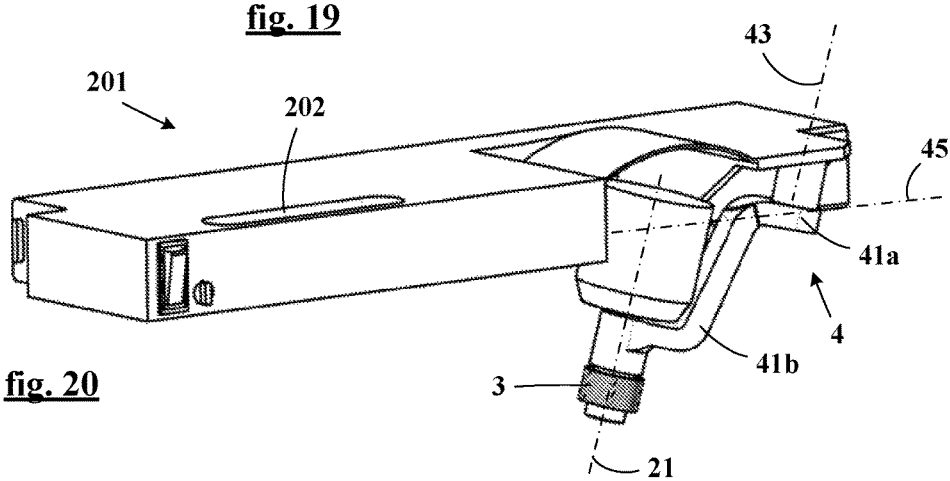
FIGS. 20 and 21: detailed views of the sub-assembly of FIG. 19.
Figure 21:
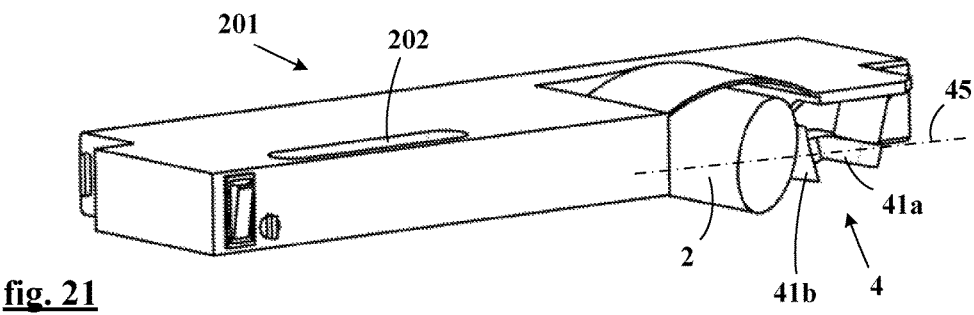

FIGS. 20 and 21 show on a larger scale the extractable sub-assembly 201 of FIG. 19. The arm 41 here comprises an articulation around a fold axis 45. This articulation allows the electrical machine to be folded against the mount when the power assistance system is not in use. Thus a substantially flat and compact sub-assembly is created, which facilitates its transport and storage. The operation of folding the electrical machine take place via a preferably electric actuator, or manually by rotation of the oscillating half-arm 41b relative to the oscillating half-arm 41a around the fold axis 45, which is here substantially parallel to the direction of travel of the bicycle. It is returned to the operating position in the reverse fashion, by moving the electrical machine in rotation around axis 45 up to its working position, the working position being determined by a rotational stop (not shown) between the oscillating half-arms 41a and 41b. We also see on these figures an orifice 202 which may be open and serve as a handle to facilitate handling of the sub-assembly for its installation, extraction and transport.

An electric power-assist kit according to the invention thus comprises an electric power-assist device as described with reference to the various embodiments illustrated by the figures, and a tyre comprising an adapted toothing, preferably a pneumatic tyre as described above with reference to FIG. 18.

In one embodiment of the invention (not shown), the separable sub-assembly may also comprise a USB type connection, allowing for example configuration or update of the control means from a computer or allowing the charging of a mobile telephone.

Alternatively, the device may comprise arms 101, 102, 103 and 104 fixed elsewhere than to the axle of the wheel 612, for example fixed to the struts of the frame above the axle of the wheel.

The invention claimed is:

1. An electric power-assist device for a bicycle, the device comprising:
   an electrical machine including a rotor;
   a movable connector structured to support the electrical machine;
   a drive pinion arranged to be driven by the rotor of the electrical machine; and
   a supporting structure,
   wherein the drive pinion is structured to mesh tangentially with a complementary toothing integral to a tyre of a rear wheel of the bicycle when the movable connector is in a meshed position,
   wherein the movable connector is structured to move the electrical machine and the drive pinion toward the meshed position and away from the meshed position,
   wherein the movable connector is borne by the supporting structure, and
   wherein the movable connector together with the electrical machine form a sub-assembly that is manually separatable from the supporting structure.

2. The electric power-assist device according to claim 1, further comprising a controller arranged to control the electrical machine, wherein the controller is borne by the supporting structure.

3. The electric power-assist device according to claim 1, further comprising a battery arranged to power the electrical machine, wherein the battery is borne by the supporting structure.

4. The electric power-assist device according to claim 1, wherein the sub-assembly includes a controller arranged to control the electrical machine.

5. The electric power-assist device according to claim 1, wherein the sub-assembly includes a battery arranged to power the electrical machine.

6. The electric power-assist device according to claim 1, wherein the electrical machine is foldable against the sub-assembly.

7. The electric power-assist device according to claim 5, wherein the battery is manually separatable from the supporting structure independently of the sub-assembly.

8. The electric power-assist device according to claim 1, wherein the sub-assembly is carried by a framework extending in a substantially horizontal plane, the sub-assembly being separatable horizontally from the supporting structure.

9. The electric power-assist device according to claim 8, wherein the sub-assembly is separatable transversely from the supporting structure.

10. The electric power-assist device according to claim 1, wherein the supporting structure includes a rapid electrical connector arranged to connect the sub-assembly to at least one interface integral with the bicycle.

11. The electric power-assist device according to claim 1, wherein the supporting structure is configured to be a luggage rack.

12. An electric power-assist device for a bicycle, the device comprising:
   an electrical machine including a rotor;
   a connector structured to attach to the electrical machine;
   a drive pinion arranged to be driven by the rotor of the electrical machine; and
   a supporting structure,
   wherein the drive pinion is structured to mesh tangentially with a complementary toothing integral to a tyre of a rear wheel of the bicycle,
   wherein the connector is borne by the supporting structure,
   wherein the connector together with the electrical machine form a sub-assembly that is manually separatable from the supporting structure, and
   wherein the connector includes an oscillating arm articulated relative to a mount borne by the supporting structure, around an axis substantially parallel to an axis of the electrical machine.

13. The electric power-assist device according to claim 1, wherein the device is included as part of a kit for the bicycle, and
   wherein the kit includes a pneumatic tyre structured to have the complementary toothing.

14. The electric power-assist device according to claim 13, wherein the kit is included as part of the bicycle.

* * * * *